United States Patent [19]

Fukuta et al.

[11] Patent Number: 4,600,147
[45] Date of Patent: Jul. 15, 1986

[54] LIQUID PROPANE GENERATOR FOR CLOUD SEEDING APPARATUS

[76] Inventors: Norihiko Fukuta, 931 E. Capitol Blvd., Salt Lake City, Utah 84103; Dragan Milosevic, Milentija Popovi a 11, 11070 N. Belgrade, Yugoslavia

[21] Appl. No.: 514,441

[22] Filed: Jul. 18, 1983

[51] Int. Cl.$^4$ ............................................. A01G 15/00
[52] U.S. Cl. ....................................................... 239/14
[58] Field of Search .................. 239/2 R, 14; 169/42, 169/85; 222/386.5, 399

[56] References Cited

U.S. PATENT DOCUMENTS

| | | | |
|---|---|---|---|
| 1,479,999 | 1/1924 | McDonald | 169/42 |
| 2,730,900 | 1/1956 | Rowley | 169/42 |
| 3,139,103 | 6/1964 | Bottum | 169/42 |
| 3,244,326 | 4/1966 | Bull | 222/399 X |
| 4,129,252 | 12/1978 | Pouring | 239/2 R |

OTHER PUBLICATIONS

"Production of Ice Crystals in Air by a Pressure–Pack Method", N. Fakuta, *Journal of Applied Meteorology*, vol. 4, No. 4, Aug. 1965, pp. 454–456.

*Primary Examiner*—Andres Kashnikow
*Assistant Examiner*—James R. Moon, Jr.
*Attorney, Agent, or Firm*—K. S. Cornaby

[57] ABSTRACT

Apparatus is provided for release of liquid propane from the holding chamber of a cloud-seeding rocket. The invention includes a liquid propane-filled bag within the chamber to expand and apply continuous pressure on the liquid propane in the chamber as it exits the chamber to be used for cloud-seeding purposes. A second aspect of the invention has a valve mechanism triggered by the ignition of a fuse to release a lever action. Admixing of small amounts of other gaseous compounds with the liquid propane enhances the ice nucleation of the liquid propane as it is discharged from the rocket.

1 Claim, 3 Drawing Figures

LIQUID PROPANE GENERATOR FOR CLOUD SEEDING APPARATUS

BACKGROUND OF THE INVENTION

This patent disclosure concerns apparatus for performing the required liquid propane discharge on cloud seeding rockets and the inclusion of special additives to the liquid propane in order to increase the efficiency of its ice nucleation.

The seeding of a supercooled cloud for purposes of weather modification requires introduction of ice crystal seeds into it in a large defined amount at an appropriate time and position of the cloud. Conventional seeding agents, such as silver iodide and dry ice, have a number of shortcomings in their practical applications. Problems with silver iodide include the high cost, the low ice crystal production at low altitudes combined with the undersirably large numbers at high altitudes, the downwind effect due to seeding agent survival, the slow ice nucleation rates at warm temperatures, and the possible adverse ecological effect due to the toxicity of the slver ions.

The use of dry ice also has its own problems, such as the difficulty of long term storage and the need for dry ice pellet preparation. Moreover, costly, high-flying aircraft are required for dispensing pellets from a position above the cloud. Conventional rocket seeding devices cannot be used, since the dry ice pellets have no self-contained power means for discharging them from the rockets, apart from the difficulty of its long term storage.

Liquid propane (LP) is known to generate large numbers of ice crystals in supercooled clouds due to extremely low temperatures induced by its evaporative cooling. The number of ice crystals per gram of liquid propane is comparable to that of one gram of dry ice. In addition to its high efficiency for ice nucleation, liquid propane has a number of practical advantages over both silver iodide and dry ice, particularly when rapid generation and spreading of a large number of ice crystals are required, such as seeding of vigorously growing convective clouds for hail-suppression purpose. The main advantages of liquid propane nucleant are that it is inexpensive, non-toxic, ecologically safe and available almost anywhere due to easiness for its long term storage, coupled with its instantaneous ice nucleation. There is no possibility for any downwind effect of ice crystal nuclei survival because the ice crystals evaporate or melt in dry or warm environments during the drift toward downwind areas. In addition, the high vapor pressure of liquid propane can be conveniently utilized for its automatic and rapid discharge from a flying rocket. In this regard, the liquid propane utilized on fast rockets is highly advantageous for cloud seeding applications where immediate seeding and ice crystal generation are required, such as in hail suppression operations.

It is an objective of this invention to provive improved apparatus for discharging liquid propane in a cloud-seeding rocket.

It is a further objective to provide for the admixing of additives to liquid propane to enhance the production of ice crystals by the liquid propane.

BRIEF SUMMARY OF THE INVENTION

The present invention includes the process of admixing one or more of the following compounds to liquid propane to increase the production of ice crystals: hydroiodic acid, carbon disulfide, hydrogen disulfide and methyl sulfide.

The invention also includes apparatus for actuating the discharge of liquid propane from a cloud-seeding rocket employing valve means at the end of tube means containing liquid propane, with the valve means being actuated by a lever mechanism utilizing fuse means to trip the lever mechanism, thereby opening the valve means and releasing the liquid propane into the cloud to form ice crystals.

A second aspect of the invention provides for means for maintaining the propane in a liquid state within the rocket, so that liquid propane is discharged from the rocket rather than gaseous propane. A pressurizing bag containing liquid propane is disposed within the rocket chamber also containing liquid propane. As the liquid propane is discharged from the rocket chamber during cloud-seeding operations, the bag expands to fill the chamber due to liquid propane evaporation, thereby providing a constant liquid propane discharge rate from the rocket regardless or rocket altitude.

DETAILED DESCRIPTION OF THE DRAWING

Figure 1:
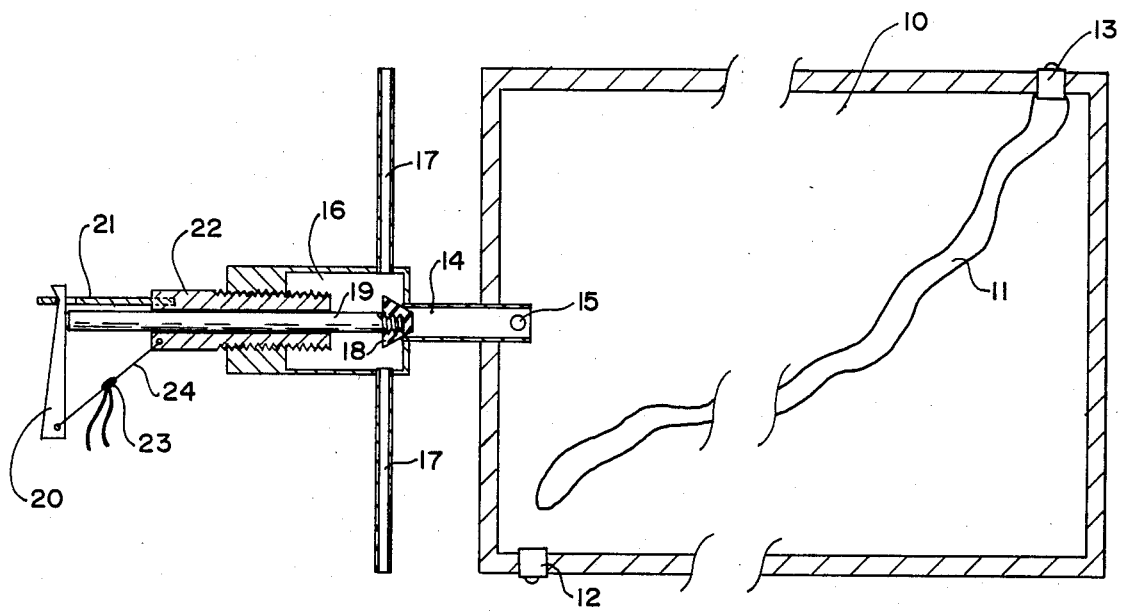
Figure 2:
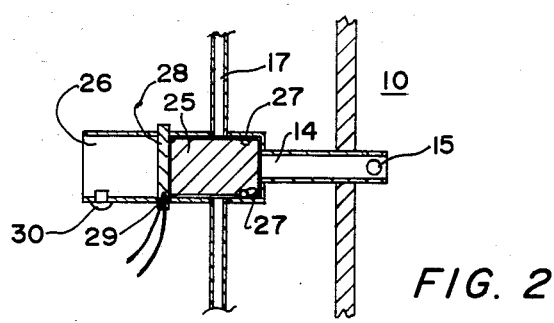
Figure 3:
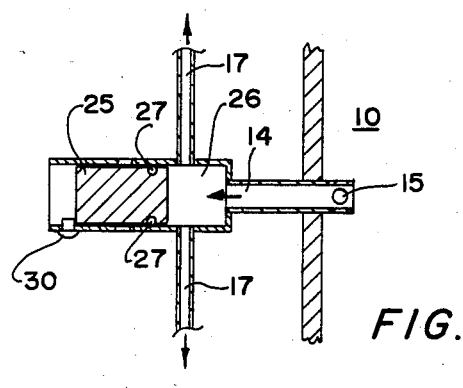

Preferred embodiments of the invention are illustrated in the attached drawing in which:

FIG. 1 is an elevational sectional view of one embodiment of the invention showing the rocket liquid propane chamber with the pressurizing bag and discharge valve assembly;

FIG. 2, a partial sectional elevation of an alternative embodiment of the valve assembly shown in FIG. 1, with the valve in the closed position; and FIG. 3, a similar view to that shown in FIG. 2, with the valve in the open position.

DETAILED DESCRIPTION OF THE ILLUSTRATED EMBODIMENTS

As shown in FIG. 1, a liquid propane chamber 10 in a cloud seeding rocket (not shown) contains a pressurizing bag 11 capable of filling the entire chamber 10 when fully expanded. Liquid propane charging valve 12 provides means for introducing liquid propane into chamber 10. Charging valve 13 provides similar means for introducing liquid propane into bag 11, which may be constructed of plastic or some similar collapsable material.

An elongate pipe means 14 has one open end inside chamber 10, preferably with aperture 15 in pipe 14 to provide for the escape of the liquid propane from chamber 10 without permitting expanding bag 11 to plug the end of pipe 14, before the maximum amount of liquid propane has been exhausted from chamber 10.

The other open end of pipe means 14 extends into a valve chamber 16 which has liquid propane exhaust ports 17 preferably extending outwardly from chamber 16. Valve means 18 acts to close off the end of pipe means 14 to prevent the escape of liquid propane from chamber 10. In this embodiment valve means 18 is a hard rubber truncated cone and is attached to an elongate rod 19. Rod 19 extends rearwardly through chamber 16 to contact at its other end with lever means 20. Lever means 20 acts to hold rod 19 and valve means 18 securely against pipe 14. A plate means 21 is connected between lever 20 and a threaded tension-adjusting barrel 22 and functions to permit regulation of the pressure of valve 18 against the opening of pipe 14 to counteract pressure from the liquid propane in chamber 10.

Lever 20 is actuated to release valve 18 by fuse means 23 attached to cord means 24 interconnecting lever 20 with barrel 22. When it is desired to release valve 18 to permit liquid propane to flow from chamber 10 into the atmosphere through pipes 17, fuse 23 is ignited, which burns through cord 24 and releases lever 20 to actuate valve 18. Cord 24 can be a simple nylon cord, such as common dental floss, or some other ignitable material. Fuse 23 can be an electric match or common timing fuse.

FIGS. 2 and 3 illustrate an alternative valving mechanism to release liquid propane from chamber 10. In this embodiment a piston 25 is disposed in cylindrical chamber 26 and sealed therein with an O-Ring 27. The piston 25 is held in the forward position, as shown in FIG. 2, against pipe 14 by means of a solid pyrotechnic mixture 28, such as cellulose nitrate, located in the chamber 26 behind piston 25. An igniter tip 29 is incorporated with the mixture 28, so that upon ignition, the mixture 28 combusts rapidly, and pressure from the liquid propane in Chamber 10 forces piston 25 back to stop bolt 30 to release liquid propane to the atmosphere through pipes 17.

It is important that the liquid propane in chamber 10 be kept in a liquid state until discharge from the cloud-seeding rocket. This is accomplished by filling both chamber 10 and bag 11 with liquid propane. It is recommended that about 4% of the liquid propane should be inserted into the bag. Then, as the liquid propane is released from the rocket, bag 11 expands to fill chamber 10, thereby keeping the pressure on the liquid propane in chamber 10 and maintaining it in a liquid state as it exits the rocket.

In the case of discharging 1 kg of the liquid propane, 40 g. of it should be charged via valve 13 into the bag 11. When valve 18 opens, the liquid propane is driven out through pipe 14 in contact with the rubber valve 18 and is discharged out of small pipes 17 attached to the valve chamber 16. The heat capacity of the seeding liquid propane and the fast speed of the rocket help maintain the temperature and therefore the pressure of the liquid propane in the bag 11 approximately at the ground level during the discharging. It has been found that additions of one of the following compounds to the liquid propane by 2% by volume would increase the number of ice crystal production by a factor of two to three. The additives are hydroiodic acid, carbon disulfide, hydrogen disulfide and methyl sulfide.

The scope of this invention as described herein encompasses any obvious alternatives known to those skilled in the art.

We claim:

1. Apparatus for maintaining pressure on liquid propane in a cloud-seeding rocket holding chamber comprising:

A chamber for holding a first quantity of liquid propane;

Bag means disposed within said chamber for holding a second quantity of liquid propane;

Valve means actuated by a lever means and cord means for releasing said first quantity of liquid propane from said chamber to the atmosphere, and Ignition means for cutting said cord means to actuate said lever means.

* * * * *